United States Patent [19]

Ahad

[11] Patent Number: 5,223,056
[45] Date of Patent: Jun. 29, 1993

[54] AZIDO THERMOPLASTIC ELASTOMERS

[75] Inventor: Elie Ahad, Ste-Foy, Canada

[73] Assignee: Her Majesty the Queen in right of Canada, as represented by the Minister of National Defence of Her Majesty's Canadian Government, Ottawa, Canada

[21] Appl. No.: 822,420

[22] Filed: Jan. 21, 1992

[51] Int. Cl.$^5$ .............................................. C06B 45/10
[52] U.S. Cl. .................... 149/19.6; 149/19.5; 149/19.4
[58] Field of Search ............... 149/19.5, 19.4, 19.6, 149/19.1; 525/403; 252/183.11

[56] References Cited

U.S. PATENT DOCUMENTS

| | | | |
|---|---|---|---|
| 4,268,450 | 5/1981 | Frankel et al. | 149/19.6 |
| 4,269,637 | 5/1981 | Flanagan | 149/19.1 |
| 4,288,262 | 9/1981 | Flanagan et al. | 149/19.6 |
| 4,875,949 | 10/1989 | Mishra et al. | 149/19.3 |
| 4,879,419 | 11/1989 | Johannessen | 568/606 |
| 4,915,755 | 4/1990 | Kim | 149/19.4 |
| 4,925,909 | 5/1990 | Kubota | 528/55 |
| 4,938,812 | 7/1990 | Flanagan et al. | 149/19.1 |
| 4,985,093 | 1/1991 | McCulloch | 149/19.4 |
| 5,061,330 | 10/1991 | Reed et al. | 149/19.6 |
| 5,067,996 | 11/1991 | Lundstrom et al. | 149/19.4 |

*Primary Examiner*—Donald P. Walsh
*Assistant Examiner*—Anthony Chi
*Attorney, Agent, or Firm*—J. Wayne Anderson

[57] ABSTRACT

Novel energetic azido thermoplastic elastomers (ATPE's) are described. Such materials are useful as binders in energetic formulations to replace conventional inert thermosetting prepolymers. The ATPE's are easily formulated either by blending or chemically bonding an energetic azido elastomeric component and a thermoplastic component. The elastomeric component is a branched chain hydroxy-terminated azido polymer or copolymer. The thermoplastic component is a commercial polyether or polyethylene oxide.

13 Claims, No Drawings

AZIDO THERMOPLASTIC ELASTOMERS

This invention relates to novel energetic azido thermoplastic elastomers (ATPE).

ATPE's are useful as binders in energetic formulations such as rocket and gun propellants, composite explosives and pyrotechnics, to enhance the performance and stability, reduce the vulnerability and improve the physico-chemical properties of the formulation.

Composite explosives and propellants employing only inert binders contain a very high proportion of energetic solid crystals which tend to make the formulation vulnerable to fragment impact, shock, fire and/or accidental stimuli. The replacement of inert binders by energetic ATPE's allows the increase of the rubbery binder proportion and the reduction of the solid crystals content without sacrificing performance and should at the same time decrease vulnerability and enhance the stability and the physico-chemical properties of the formulation.

Commercial inert TPEs are not easily formulated in military applications because their melting or softening temperature as well as their viscosity are relatively high, even at elevated temperature in the range of 60°-90° C. Currently, there is no commercial source of energetic TPE's. Moreover thermoset prepolymers require curing (e.g. with isocyanate curing agents) during formulation and result in certain irreversible properties.

For example, the novel ATPE's may be used to replace TNT in melt cast explosives and to replace the thermoset binders used in solid rocket propellants and plastic bonded explosives.

According to one aspect of the invention, an energetic azido thermoplastic elastomer is provided, comprising a substantially homogeneous blend of a) 70 to 95%/wt of an elastomeric branched chain hydroxy-terminated aliphatic azido polymer component of structural Formula I or II

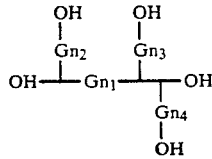
                I wherein

G = Glycidyl azide polymer (GAP) Unit

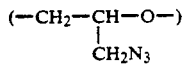

n = total number of GAP units;

$$n = n_1 + n_2 + n_3 + n_4 + \ldots + n_s = \sum_{i=1}^{s} n_i$$

$n_1$ = number of GAP units in segment 1;
$n_2$ = number of GAP units in segment 2;
$n_s$ = number of GAP units in segment s; at least one of $n_2 \ldots n_s$ is equal to or greater than 1;
s = total number of segments in the molecule;
$10 \leq n \leq 2000$, of a functionality of about 2 to 10, and a molecular weight of 1,000 to 200,000; or

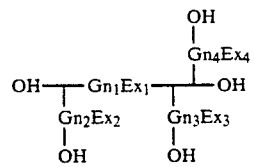
                II wherein

E is a (—O—R) unit, where R is C1 to C4 lower-alkyl;
n = total number of GAP units in the copolymer;
x = total number of E units in the copolymer;
$n_1$ and $x_1$ are respectively the number of GAP and E units in segment 1;
$n_2$ and $x_2$ are respectively the number of GAP units and E units in segment 2;
$n_s$ and $x_s$ are respectively the number of GAP and E units in segment s; at least one of $n_2 \ldots n_s$ and $x_2 \ldots x_s$ is equal to or greater than 1;
s = total number of segments in the copolymer;

$$n = n_1 + n_2 + \ldots + n_s = \sum_{i=1}^{s} n_i$$

$$x = x_1 + x_2 + \ldots + x_s = \sum_{i=1}^{s} x_i$$

$7 \leq n \leq 1400$;
$7 \leq x \leq 1400$, of a functionality of about 2 to 10, and a molecular weight of 1,000 to 200,000, and b) 5 to 30 %/wt of a thermoplastic component.

According to another aspect of the invention an energetic azido thermoplastic elastomer is provided, comprising the reaction product of:

a) an elastomeric branched chain hydroxy-terminated aliphatic azido polymer component in an amount of 70 to 95% wt, of structural formula I or II

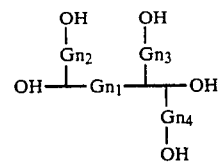
                I wherein

G = Glycidyl azide polymer (GAP) Unit

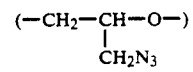

n = total number of GAP units;

$$n = n_1 + n_2 + n_3 + n_4 + \ldots + n_s = \sum_{i=1}^{s} n_i$$

$n_1$ number of GAP units in segment 1;
$n_2$ = number of GAP units in segment 2;
$n_s$ = number of GAP units in segment s; at least one of $n_2 \ldots n_s$ is equal to or greater than 1; s = total number of segments in the molecule;
$10 \leq n \leq 2000$, of a functionality of about 2 to 10, and a molecular weight of 1,000 to 200,000; or

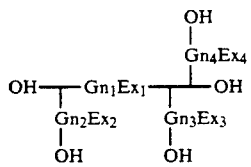

wherein

E is a (—O—R) unit, where R is C1 to C4 lower-alkyl;
n = total number of GAP units in the copolymer;
x = total number of E units in the copolymer;
$n_1$ and $x_1$ are respectively the number of GAP and E units in segment 1;
$n_2$ and $x_2$ are respectively the number of GAP units and E units in segment 2;
$n_s$ and $x_s$ are respectively the number of GAP and E units in segment s;
s = total number of segments in the copolymer; at least one of $n_2 \ldots n_s$ and $x_2 \ldots x_s$ is equal to or greater than 1;

$$n = n_1 + n_2 + \ldots + n_s = \sum_{i=1}^{s} n_i$$

$$x = x_1 + x_2 + \ldots + x_s = \sum_{i=1}^{s} x_i$$

$7 \leq n \leq 1400$;
$7 \leq x \leq 1400$, of a functionality of about 2 to 10, and a molecular weight of 1,000 to 200,000, and b) a thermoplastic component in an amount of 5 to 30%/wt, and c) a suitable cross-linking agent.

Preferably, the azido thermoplastic elastomer comprises 75 to 90%/wt of component (a) and 10 to 25%/wt of component (b).

The physic-chemical properties of the ATPE's according to the invention may be varied and predetermined to suit the application. Specifically, the mechanical properties, softening temperatures, glass transition temperature and energetic content could be varied over a wide range and tailored to the desired value by varying the type, molecular weight and proportion of both the elastomeric and thermoplastic components.

The elastomeric component provides rubber-like properties in the temperature range of from −40° to 60° C., and the thermoplastic component provides the reversible properties which facilitate processing. For example, formulation may be effected just by heating and no additional curing agents are required during the processing. Accordingly, the resulting azido thermoplastic elastomer is a soft rubber-like material at room temperature but is fluidized (melts or softens) when the polymer is heated to elevated temperatures and recovers its elastomeric properties on gradual cooling.

The elastomeric component and a method of preparation therefor are specifically described in applicants' U.S. Pat. application Ser. No. 680,927 filed 5 Apr. 1991.

More specifically, the elastomeric component is a glycidyl azide polymer (GAP) or a copolymer of GAP with alkylene oxides such as ethylene oxide, designated GEC. GAP polymers are formed from a polyepichlorohydrin (PECH) starting material, and GEC copolymers are formed from a epichlorohydrin-alkylene oxide (e.g. ethylene oxide) copolymer (PEEC) starting material. These starting materials are cheap (less than $3/lb) industrial rubbers and are readily available commercially.

Suitable materials for the thermoplastic component include polyethers, polyethylene oxide (PEO) and mixtures thereof. Mixtures of such materials could also be used. Representative polyethers include polyethylene glycol (PEG) and polyethylene glycol methyl ether (PEGME). These polyethers are relatively cheap and commercially available in a wide range of molecular weight and melting temperature. Table I which follows, lists various processing properties including molecular weight (MW), melting temperature (Tm in ° C.) and Form.

TABLE 1

| TYPE | STRUCTURE | MW | Tm (°C.) | FORM |
|------|-----------|-----|----------|------|
| PEG | $H(O-CH_2-CH_2)_xOH$ | 600 | 22 | moist solid |
|  |  | 1,500 | 45 | waxy solid |
|  |  | 3,400 | 55 | powder |
| PEGME | $CH_3(O-CH_2-CH_2)_xOH$ | 5,000 | 60 | powder |
| PEO | $(CH_2-CH_2-O)_xH$ | 100,000 | 66 | powder |

The ATPE's according to the invention are used typically in the form of a substantially homogeneous blend of elastomeric and thermoplastic components. Since both components are polyethers with similar backbones, they then form miscible and compatible polymer blends (as alloys).

Alternatively, the elastomeric and thermoplastic components may also be chemically bonded using a suitable cross-linking agent. For example, since the two components have terminal OH groups they can be bonded by chemical reaction with an isocyanate cross-linking agent. Useful isocyanates include di-or polyisocyanates such as m- or p-phenylene diisocyanate, 2,4-toluene diisocyanate, 1,5-naphthyl diisocyanate, methylene di p-phenyl diisocyanate, hexamethylene diisocyanate and triphenyl methane tri-isocyanate. Preferably, the amount of isocyanate is sufficient to provide an NCO:OH ratio of 0.5 to 1.0.

The following example describes the preparation of ATPE by the blending method.

EXAMPLE 1

7–9.5 g of elastomeric component (GAP or GEC) are dissolved in 100 ml of $MeCl_2$. 0.5–3 g of the thermoplastic component (PEG, PEO, PEGME or a mixture of different polyethers) are then added to the $MeCl_2$ solution. Agitation is carried out at room temperature to obtain a substantially homogeneous solution. The solvent is then evaporated to obtain a rubberlike ATPE. The properties of some ATPE prepared by blending are reported in Table 2 below.

TABLE 2

| | Properties of Some ATPE Prepared by Blending | | | | | | | |
|---|---|---|---|---|---|---|---|---|
| | Elastomeric Component | | | Thermoplastic Component | | | $T_g$ | T softening | G |
| TYPE | Polymer | MW | Wt % | Polymer | MW | Wt % | (°C.) | (°C.) | (Pa) |
| ENERGETIC | GAP | 130,000 | 85 | PEG/PEO | 600/100,000 | 10/5 | −54 | 65–80 | 2,700 |

TABLE 2-continued

Properties of Some ATPE Prepared by Blending

| TYPE | Elastomeric Component | | | Thermoplastic Component | | | $T_g$ (°C.) | T softening (°C.) | G (Pa) |
|---|---|---|---|---|---|---|---|---|---|
| | Polymer | MW | Wt % | Polymer | MW | Wt % | | | |
| | | 130,000 | 85 | PEG | 3,400 | 15 | −48 | 75−90 | 26,000 |
| | | 130,000 | 90 | PEG | 1,500 | 10 | −58 | 65−75 | 7,400 |
| | | 130,000 | 85 | PEO | 100,000 | 15 | −48 | 80−90 | 38,000 |
| ENERGETIC | GEC | 180,000 | 90 | PEG | 1,500 | 10 | −58 | 65−75 | 37,000 |
| | | 180,000 | 90 | PEO | 100,000 | 10 | −58 | 70−85 | 37,000 |

(Wherein G is the elastic modulus determined at 0.16 Hz and 10% strain)

EXAMPLE 2

This example describes the preparation of ATPE by the chemical bonding method.

7-9.5 g of elastomeric component (GAP or GEC) are dissolved in 100 ml of MeCl$_2$. 0.5-3 g of thermoplastic component (PEG, PEO, PEGME or a mixture of different polyethers) are then added to the MeCl$_2$ solution. Agitation is carried out at room temperature to obtain a substantially homogeneous solution. 0.4-1.5 g of MDI (Methylene di-p-phenyl di-isocyanate) is then added to the solution. The amount of MDI added is calculated according to the ratio (NCO/OH)=1.0. The solution is then heated at about 60° C. for 1-2 days to evaporate the solvent and to complete the isocyanate-polyether reaction. The properties of some azido TPE prepared by chemical reaction was reported in Table 3 below. The properties of two samples of commercial inert TPE (the components are chemically bonded) are also listed in Table 3 for comparison purposes).

TABLE 3

Properties of some TPE prepaed by Chemical reaction

| TYPE | Elastomeric Component | | | Thermoplastic Component | | | $T_g$ (°C.) | T softening (°C.) | G (Pa) |
|---|---|---|---|---|---|---|---|---|---|
| | Polymer | MW | Wt % | Polymer | MW | Wt % | | | |
| ENERGETIC | GAP | 100,000 | 85 | PEG | 1,500 | 15 | −42 | 85−95 | 21,000 |
| | | 100,000 | 85 | PEG | 600 | 15 | −42 | 85−95 | 38,000 |
| INERT (commercial samples) | N-Butyl Acrylate | 220,000 | 90 | Polystyrene | 25,000 | 10 | −52 | 100−125 | 4,700 |
| | N-Butyl Acrylate | 470,000 | 85 | Polystyrene | 13,000 | 15 | −50 | 100−125 | 15,000 |

(G is the elastic modulus determined at 0.16 Hz and 10% strain)

Accordingly the physico-chemical and mechanical properties of the ATPEs may be tailored to suit the requirement. The results listed in Tables 2 and 3 indicate that the properties of the ATPE's depend on the type and composition of both the elastomeric and thermoplastic components as well as on the method of preparation. Since GAP and GEC contain azide groups, the energetic content of the ATPE's can be increased by increasing the proportion of the elastomeric component. The replacement of GAP by GEC will generally improve the physico-chemical properties of the ATPE's but will reduce its energetic content since GEC is a copolymer containing 70% GAP and 30% Ethylene Oxide. The use of PEO as a thermoplastic component instead of PEG will yield ATPE's with relatively higher G and Tg values. The reduction of the MW of the PEG thermoplastic component will cause a lowering of the values of Tg and G for the ATPE product. The ATPE's prepared by chemical reaction have generally higher G and Tg values than the ATPE's prepared by blending and the inert commercial TPE's.

The physico-chemical and mechanical properties of the ATPE's prepared by chemical reaction can also be modified and controlled by varying the isocyanate proportion relative to the hydroxy-terminated polyethers (elastomeric and thermoplastic components); the reduction of the isocyanate concentration (NCO/OH ratio below 1-0) will produce softer ATPE's with lower G and Tg values.

The embodiments of the invention in which an exclusive property or privilege is claimed are defined as follows:

1. An energetic azido thermoplastic elastomer, comprising a substantially homogeneous blend of:
   a) 70 to 95 %/wt an elastomeric branched chain hydroxy-terminated aliphatic azido polymer component of structural Formula I or II

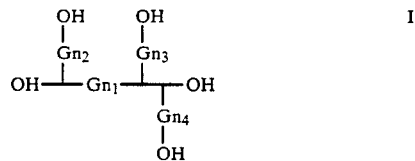

wherein
G = Glycidyl Azide Polymer (GAP) unit

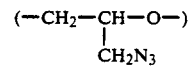

n = total number of GAP units;

$$n = n_1 + n_2 + n_3 + n_4 + \ldots + n_s = \sum_{i=1}^{s} n_i$$

$n_1$ = number of GAP units in segment 1;
$n_2$ = number of GAP units in segment 2;
$n_3$ = number of GAP units in segment s;
at least one of $n_2 \ldots n_s$ is equal to or greater than 1;
s = total number of segments in the molecule;
$10 \leq n \leq 2000$, of a functionality of about 2 to 10, and a molecular weight of 1,000 to 200,000; or

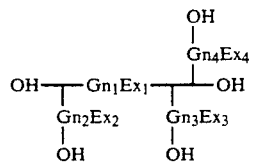

wherein

E is a (—O—R) unit, where R is C1 to C4 lower-alkyl;

n = total number of GAP units in the copolymer;

x = total number of E units in the copolymer;

$n_1$ and $x_1$ are respectively the number of GAP and E units in segment 1;

$n_2$ and $x_2$ are respectively the number of GAP units and E units in segment 2;

$n_s$ and $x_s$ are respectively the number of GAP and E units in segment s;

at least one of $n_2 \ldots n_s$ and $x_2 \ldots x_s$ is equal to or greater than 1;

s = total number of segments in the copolymer;

$$n = n_1 + n_2 + \ldots + n_s = \sum_{i=1}^{s} n_i$$

$$x = x_1 + x_2 + \ldots + x_s = \sum_{i=1}^{s} x_i$$

$7 \leq n \leq 1400$;

$7 \leq x \leq 1400$, of a functionality of about 2 to 10, and a molecular weight of 1,000 to 200,000, and b) 5 to 30 %/w of a thermoplastic component.

2. An energetic azido thermoplastic elastomer according to claim 1, wherein the thermoplastic component is selected from the group consisting of polyethers, polyethylene-oxide, and mixtures thereof.

3. An energetic azido thermoplastic elastomer according to claim 2, comprising 75 to 90 %/wt of component (a) and 10 to 25 %/wt of component (b)

4. An energetic azido thermoplastic elastomer according to claim 3, wherein the thermoplastic component is a polyether.

5. An energetic azido thermoplastic elastomer according to claim 4, wherein the polyether is polyethylene glycol.

6. An energetic azido thermoplastic elastomer, comprising the reaction product of a) an elastomeric branched chain hydroxy-terminated aliphatic azido polymer component of structural Formula I or II

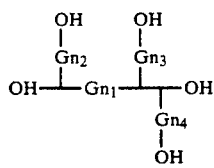

wherein

G = Glycidyl Azido Polymer (GAP) Unit

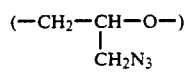

n = total number of GAP units;

$$n = n_1 + n_2 + n_3 + n_4 + \ldots + n_s = \sum_{i=1}^{s} n_i$$

$n_1$ = number of GAP units in segment 1;
$n_2$ = number of GAP units in segment 2;
$n_s$ = number of GAP units in segment s;
at least one of $n_2 \ldots n_s$ is equal to or greater than 1;
s = total number of segments in the molecule;
$10 \leq n \leq 2000$, of a functionality of about 2 to 10, and a molecular weight of 1,000 to 200,000; or

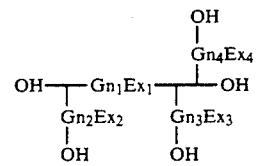

wherein

E is a (—O—R) unit, where R is C1 to 4 lower-alkyl;

n = total number of GAP units in the copolymer;

x = total number of E units in the copolymer;

$n_1$ and $x_1$ are respectively the number of GAP and E units in segment 1;

$n_2$ and $x_2$ are respectively the number of GAP units and E units in segment 2;

$n_s$ and $x_s$ are respectively the number of GAP and E units in segment s;

at least one of $n_2 \ldots n_s$ and $x_2 \ldots x_s$ is equal to or greater than 1;

s = total number of segments in the copolymer;

$$n = n_1 + n_2 + \ldots + n_s = \sum_{i=1}^{s} n_i$$

$$x = x_1 + x_2 + \ldots + x_s = \sum_{i=1}^{s} x_i$$

$7 \leq n \leq 1400$;

$7 \leq x \leq 1400$, of a functionality of about 2 to 10, and a molecular weight of 1,000 to 200,000, in an amount of 70 to 95 %/w, and b) a thermoplastic component in an amount of 5 to 30%/w, and c) a suitable cross-linking agent.

7. An energetic azido thermoplastic elastomer according to claim 6 wherein the thermoplastic component is selected from the group consisting of polyethers, polyethylene-oxide, and mixtures thereof.

8. An energetic azido thermoplastic elastomer according to claim 7, comprising 75 to 90 %/wt of component (a) and 10 to 25%/wt of component (b).

9. An energetic azido thermoplastic elastomer according to claim 8, wherein the thermoplastic component is a polyether.

10. An energetic azido thermoplastic elastomer according to claim 9, wherein the polyether is polyethylene glycol.

11. An energetic azido thermoplastic elastomer according to claim 6, wherein the cross-linker is an isocyanate.

12. An energetic azido thermoplastic elastomer according to claim 11, wherein the amount of isocyanate is sufficient to provide an NCO:OH ratio of between 0.50 and 1.0.

13. An energetic azido thermoplastic elastomer according to claim 12, wherein the isocyanate is a polyisocyanates selected from the group consisting of di- or polyisocyanates such as m-or p-phenylene diisocyanate, 2,4-toluene diisocyanate, 1,5-naphthyl diisocyanate, methylene di(p-phenyl diisocyanate), hexmaethylene diisocyanate and triphenyl methane tri-isocyanate.

* * * * *